(12) United States Patent
Ogaki (10) Patent No.: US 12,320,766 B2
(45) Date of Patent: Jun. 3, 2025

(54) DETECTION DEVICE (71) Applicant: HONDA MOTOR CO., LTD., Tokyo (JP)

(72) Inventor: Toru Ogaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 518 days.

(21) Appl. No.: 17/885,926

(22) Filed: Aug. 11, 2022

(65) Prior Publication Data

US 2023/0059792 A1   Feb. 23, 2023

(30) Foreign Application Priority Data

Aug. 18, 2021 (JP) .................. 2021-133305

(51) Int. Cl.
*G01N 25/72* (2006.01)
*B60K 1/04* (2019.01)
*B60L 58/24* (2019.01)

(52) U.S. Cl.
CPC ............. *G01N 25/72* (2013.01); *B60K 1/04* (2013.01); *B60L 58/24* (2019.02); *B60K 2001/0438* (2013.01)

(58) Field of Classification Search
CPC ... H01M 10/658; H01M 50/549; G01N 25/72
See application file for complete search history.

(56) References Cited

U.S. PATENT DOCUMENTS

2019/0037738 A1* 1/2019 Dunn .................. F28F 3/00

FOREIGN PATENT DOCUMENTS

JP        2003-317799 A    11/2003

* cited by examiner

*Primary Examiner* — Mirellys Jagan
(74) *Attorney, Agent, or Firm* — Paratus Law Group, PLLC (57) ABSTRACT

A detection device configured to detect a decrease in heat insulation performance of a battery pack mounted at an electrically powered vehicle, the detection device including: a heat insulation performance derivation unit configured to derive a heat insulation performance value, which is an evaluation value of the heat insulation performance, based on a temperature change of the battery and an environmental temperature in a predetermined period in which the electrically powered vehicle is stopped; a determination unit configured to determine, based on the heat insulation performance value derived by the heal insulation performance derivation unit and a predetermined reference value, whether the decrease in the heat insulation performance occurs; and an output unit configured to output, when the determination unit determines that the decrease in the heat insulation performance occurs, detection information indicating that the decrease in the heat insulation performance occurs.

9 Claims, 5 Drawing Sheets

DETECTION DEVICE

CROSS REFERENCE TO RELATED APPLICATIONS

This application claims priority to Japanese Patent Application No. 2021-133305 filed on Aug. 18, 2021, the content of which is incorporated herein by reference.

TECHNICAL FIELD

The present invention relates to a detection device that detects a decrease in heat insulation performance of an object formed by surrounding an outside thereof with a heat insulation material.

BACKGROUND ART

In recent years, as a specific measure against global climate change, efforts for realizing a low-carbon society or a decarbonized society are active. Also in vehicles, a reduction in a $CO_2$ emission amount is strongly required, and a drive source is rapidly electrified. Specifically, a vehicle (hereinafter, also referred to as an "electrically powered vehicle") including an electric motor as a drive source and a battery as a power source capable of supplying a power to the electric motor, such as an electrical vehicle or a hybrid electrical vehicle, is developed.

From a viewpoint of preventing deterioration, a battery may be used in a state of being maintained in an appropriate temperature range by a temperature control system. For example, JP 2003-317799 A discloses a technique in which heated air taken out by a heat exchanger from exhaust heat from a cogeneration system such as a fuel cell is blown into a heat insulation container with a fan to heat or keep warm a sodium-sulfur battery disposed in the heat insulation container.

Heat insulation performance of an object formed by surrounding an outside thereof with a heat insulation material, such as a battery pack including a battery housed in a case having a heat insulation property, may decrease during a use process of the object. If a user does not notice that the heart insulation performance of the object is decreased and continuously performs operation as it is, it is difficult to maintain a temperature of the object in an appropriate range, or a large amount of energy is required to maintain the temperature of the object in the appropriate range. In order to avoid occurrence of such a situation, it is desired that the user or the like can easily monitor whether the heat insulation performance of the object is maintained.

An object of the present invention is to provide a detection device capable of easily-monitoring whether heat insulation performance of an object formed by surrounding an outside thereof with a heat insulation material is maintained.

SUMMARY OF INVENTION

According to an aspect of the present invention, there is provided a detection device configured to detect a decrease in heat insulation performance of a battery pack mounted at an electrically powered vehicle, the battery pack including a battery and at least one battery temperature sensor capable of detecting a temperature of the battery which are housed in a case having a heat insulation property, the electrically powered vehicle including, outside the battery pack, an environmental temperature sensor capable of detecting an environmental temperature around the electrically powered vehicle. The detection device includes: a heat insulation performance derivation unit configured to derive a heat insulation performance value, which is an evaluation value of the heat insulation performance, based on a temperature change of the battery detected by the battery temperature sensor and an environmental temperature detected by the environmental temperature sensor in a predetermined period in which the electrically powered vehicle is stopped; a determination unit configured to determine, based on the heat insulation performance value derived by the heat insulation performance derivation unit and a predetermined reference value, whether the decrease in the heat insulation performance occurs; and an output unit configured to output, when the determination unit determines that the decrease in the heat insulation performance occurs, detection information indicating that the decrease in the heat insulation performance occurs.

DESCRIPTION OF EMBODIMENTS

Hereinafter, an embodiment of a detection device of the present invention will be described in detail with reference to the drawings. The embodiment described below is an example in which the detection device of the present invention is applied to a control device detecting a decrease in heat insulation performance of a battery pack mounted at an electrically powered vehicle. In the following description, the terms "front", "rear", "upper", "lower", "left", and "right" refer to directions viewed from an operator of the electrically powered vehicle (hereinafter, also simply referred to as a "vehicle") mounted with the control device which is an example of the detection device of the present invention. In the drawings, a front side of the vehicle is indicated as Fr, a rear side is indicated as Rr, an upper side is indicated as U, a lower side is indicated as D, a right side is indicated as R, and a left side is indicated as L.

[Vehicle]

Figure 1:
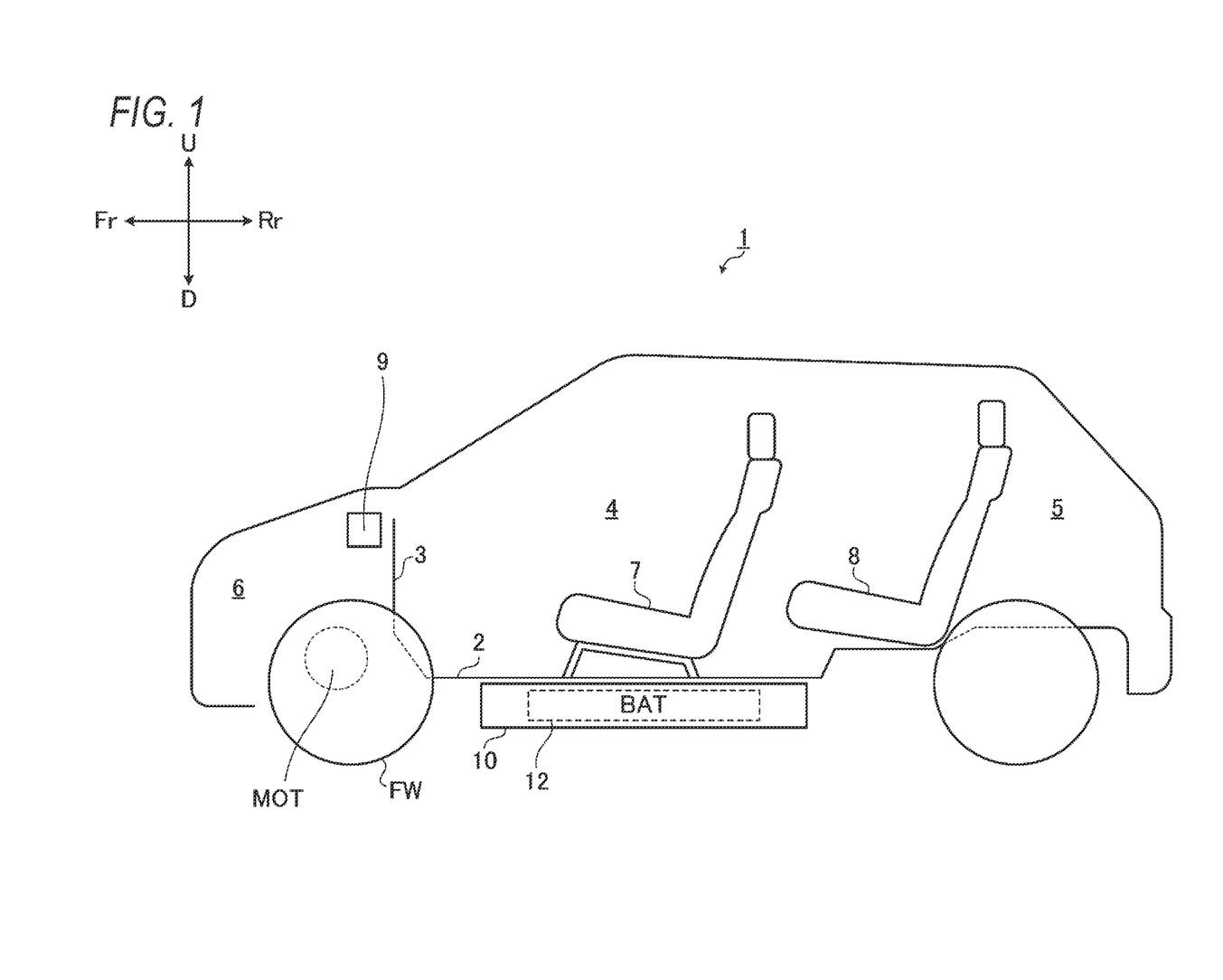
FIG. 1 is a schematic configuration diagram of a vehicle 1 at which a control device 20 which is an embodiment of a detection device of the present invention is mounted.

As shown in FIG. 1, a vehicle 1 is partitioned into a passenger compartment 4 and a luggage compartment 5, and a front room 6 in front of the passenger compartment 4 and the luggage compartment 5 by a floor panel 2 and a dash panel 3. A front seat 7 and a rear seat 8 are provided in the passenger compartment 4, and a drive motor MOT as a drive source for driving left and right front wheels FW is provided in the front room 6. A battery pack 10 including a battery (shown as "BAT") 12 as a power source capable of supplying a power to the drive motor MOT is disposed below the passenger compartment 4.

The vehicle 1 is an electrically powered vehicle that travels by driving the drive motor MOT with the power of the battery 12, and is, for example, an electrical vehicle. The power of the battery BAT may be supplied to the drive motor MOT after being converted into a predetermined power suitable for driving the drive motor MOT by a power conversion device (for example, an inverter or a DC/DC converter) (not shown).

An environmental temperature sensor 9 capable of detecting an environmental temperature around the vehicle 1 is provided in the front room 6. The environmental temperature sensor 9 detects, for example, an air temperature around the vehicle 1 as the environmental temperature at a predetermined timing, and transmits a detection signal indicating the detected environmental temperature to a control device 20 to be described later. For communication between the environmental temperature sensor 9 and the control device 20, for example, an in-vehicle network such as a controller area network (CAN) can be used.

[Battery Pack]

Figure 2:
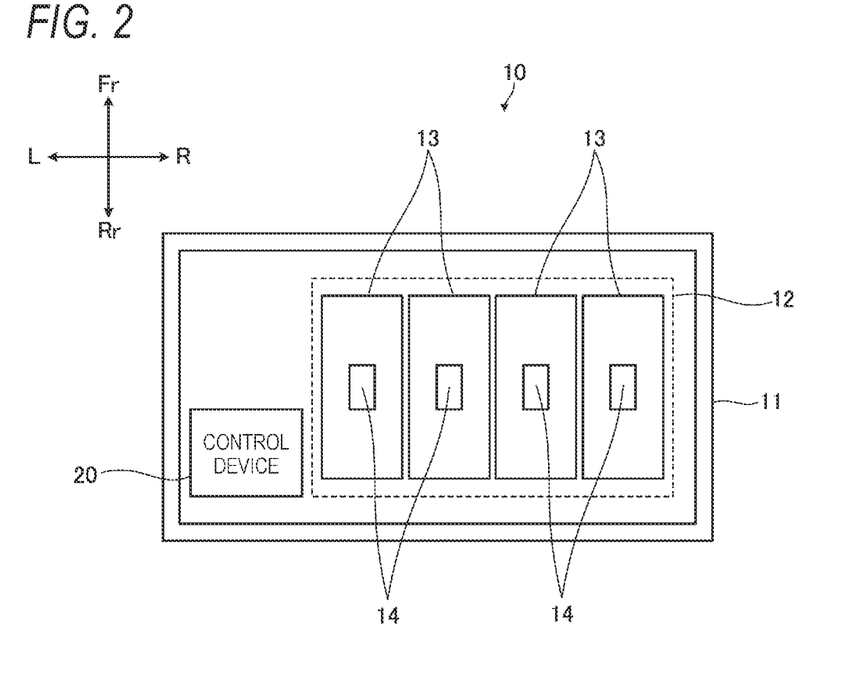
FIG. 2 is a schematic configuration diagram of a battery pack 10 mounted at the vehicle 1.

Next, the battery pack 10 will be described. As shown in FIG. 2, the battery pack 10 includes the battery 12 and a battery temperature sensor 14 capable of detecting a temperature of the battery 12 which are housed in a case 11 having a heat insulation property. Normally, in a state where the battery pack 10 is mounted at the vehicle 1, an inside of the case 11 is a closed space, and the battery 12 and the battery temperature sensor 14 are provided in the closed space.

The battery 12 can output a high voltage of, for example, 100 [V] to 200 [V] by connecting a plurality of battery modules 13 in series. The battery module 13 is implemented by connecting in series a plurality of power storage cells which are implemented by, for example, a lithium ion battery, a nickel hydrogen battery, or the like.

A plurality of the battery temperature sensors 14 are provided to correspond to the respective battery modules 13. The battery temperature sensor 14 detects a temperature of the corresponding battery module 13 at a predetermined timing, and transmits a detection signal indicating the detected temperature to the control device 20. For communication between the battery temperature sensor 14 and the control device 20, for example, the above-described in-vehicle network can be used.

The control device 20 which is the example of the detection device of the present invention is a device that detects a decrease in heat insulation performance of the battery pack 10 based on a temperature change of the battery BAT detected by the battery temperature sensor 14 and an environmental temperature detected by the environmental temperature sensor 9. The control device 20 can be implemented by, for example, an electronic control unit (ECU) including a processor performing various calculations, a storage device storing various information, an input/output device controlling input and output of data between an inside and an outside of the control device 20, and the like. The control device 20 may be implemented by a single ECU, or may be implemented by cooperation of a plurality of ECUs.

In the present embodiment, the control device 20 is provided in the battery pack 10, but the present invention is not limited thereto, and the control device 20 may be provided outside the battery pack 10 (for example, in the front room 6).

[Control Device]

Figure 3:
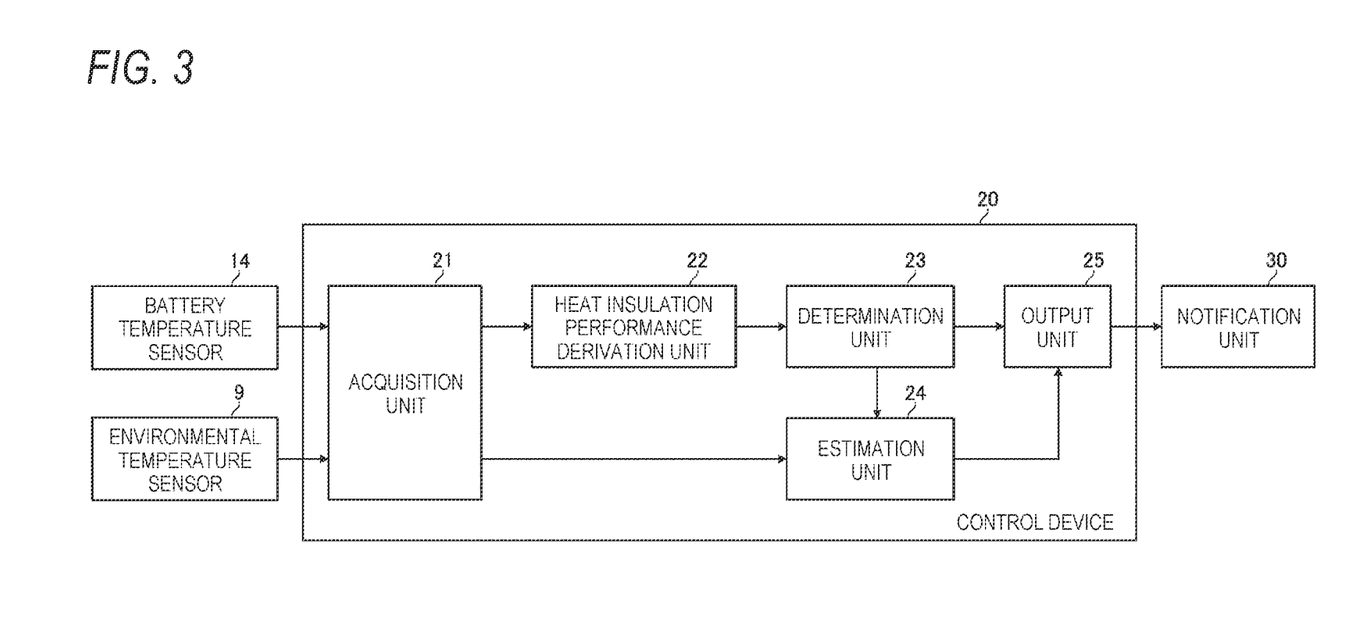
FIG. 3 is a block diagram showing a functional configuration of the control device 20.

Next, an example of a functional configuration of the control device 20 will be described. As shown in FIG. 3, the control device 20 includes an acquisition unit 21, a heat insulation performance derivation unit 22, a determination unit 23, an estimation unit 24, and an output unit 25.

The acquisition unit 21 acquires environmental temperature information indicating the environmental temperature detected by the environmental temperature sensor 9 and battery temperature information indicating the temperature of the battery module 13 (that is, the battery 12) detected by the battery temperature sensor 14. The environmental temperature information can be acquired based on the detection signal received by the control device 20 from the environmental temperature sensor 9. The battery temperature information can be acquired based on the detection signal received by the control device 20 from the battery temperature sensor 14.

For example, when the acquisition unit 21 acquires the environmental temperature information or the battery temperature information, the acquisition unit 21 stores, in the storage device or the like of the control device 20, the acquired information and the information indicating a time at which the information is acquired in association with each other. The information indicating the time can be acquired by, for example, a real-time clock (RFC) (not shown) provided in the control device 20.

The acquisition unit 21 acquires battery temperature information indicating a temperature of the battery module 13 detected by the battery temperature sensor 14 when an ignition power source of the vehicle 1 is turned off. For example, when the control device 20 receives an IG-off signal indicating that the ignition power source of the vehicle 1 is turned off from another control device (not shown), the control device 20 transmits a detection request to the battery temperature sensor 14. In response to the detection request, the battery temperature sensor 14 detects a temperature of the corresponding battery module 13, and transmits a detection signal indicating the detected temperature to the control device 20. Accordingly, the acquisition unit 21 can acquire the battery temperature information indicating the temperature of the battery module 13 detected by the battery temperature sensor 14 when the ignition power source of the vehicle 1 is turned off.

Further, the acquisition unit 21 acquires battery temperature information indicating a temperature of the battery module 13 detected by the battery temperature sensor 14 when a predetermined period (for example, one hour) is elapsed after the ignition power source of the vehicle 1 is turned off. For example, when the predetermined period is elapsed after the ignition power source of the vehicle 1 is turned off, the control device 20 transmits a detection request to the battery temperature sensor 14 again. In response to the detection request, the battery temperature sensor 14 detects a temperature of the corresponding battery module 13, and transmits a detection signal indicating the detected temperature to the control device 20. Accordingly, the acquisition unit 21 can acquire the battery temperature information indicating the temperature of the battery module 13 detected by the battery temperature sensor 14 when the predetermined period is elapsed after the ignition power source of the vehicle 1 is turned off. The above-described predetermined period is set in advance in the control device 20 by a manufacturer or the like of the control device 20.

The control device 20 also transmits a detection request to the environmental temperature sensor 9 at a predetermined timing, for example. In response to the detection request, the environmental temperature sensor 9 detects an environmental temperature around the vehicle 1, and transmits a detection signal indicating the detected environmental temperature to the control device 20. Accordingly, the acquisition unit 21 can acquire environmental temperature information indicating the environmental temperature detected by the environmental temperature sensor 9 at the predetermined timing. A timing for causing the environmental temperature sensor 9 to detect an environmental temperature may be a timing when the ignition power source of the vehicle 1 is turned off, a timing when the predetermined period is elapsed after the ignition power source of the vehicle 1 is turned off, or any timing during the predetermined period.

The heat insulation performance derivation unit 22 derives a heat insulation performance value, which is an evaluation value of the heat insulation performance of the battery pack 10, based on a temperature change of the battery 12 detected by the battery temperature sensor 14 and an environmental temperature detected by the environmental temperature sensor 9 during the above-described predetermined period in which the ignition power source of the vehicle 1 is turned off (that is, the vehicle 1 is stopped).

Specifically, when a length of the predetermined period is t, the environmental temperature is Ta, a temperature of the battery 12 at the beginning of the predetermined period is T0, a temperature of the battery 12 at the end of the predetermined period is T1, and the heat insulation performance value is τ, the heat insulation performance derivation unit 22 derives the heat insulation performance value τ by the following equation (1).

$$\tau = \frac{t}{\ln\left(\frac{T_a - T_0}{T_a - T_1}\right)} \quad (1)$$

As T0 in the above-described equation (1), for example, an average value or a median value of the temperatures of the battery modules 13 when the ignition power source of the vehicle 1 is turned off can be adopted. As T1 in the above-described equation (1), for example, an average value or a median value of the temperatures of the battery modules 13 when the predetermined period is elapsed after the ignition power source of the vehicle 1 is turned off can be adopted.

As Ta in the above-described equation (1), for example, any one of the environmental temperature when the ignition power source of the vehicle 1 is turned off, the environmental temperature when the predetermined period is elapsed after the ignition power source of the vehicle 1 is turned off, and an environmental temperature at any timing during the predetermined period can be adopted. As Ta in the above-described equation (1), an average value or a median value of the environmental temperatures at the above-described timing may be adopted. That is, a change in the environmental temperature is smaller than that of the temperature of the battery BAT, and thus the heat insulation performance value τ derived by the above-described equation (1) does not change so much regardless of which of the above-described environmental temperatures is adopted as Ta.

Based on the heat insulation performance value τ derived by the heat insulation performance derivation unit 22 and a predetermined reference value as a determination reference for determining whether a decrease in the heat insulation performance of the battery pack 10 occurs, the determination unit 23 determines whether the decrease in the heat insulation performance of the battery pack 10 occurs. Here, as indicated by a solid line of a reference sign 401 in FIG. 4, the reference value is determined in consideration of the decrease in the heat insulation performance due to deterioration over time of the battery pack 10.

For example, when a difference between the heat insulation performance value τ and the reference value is larger than a predetermined threshold value, the determination unit 23 determines that the decrease in the heat insulation performance of the battery pack 10 occurs. Specifically, a broken line 402 in FIG. 4 indicates a value obtained by subtracting the above-described threshold value from the reference value, and when the heat insulation performance value τ falls below the broken line 402, the determination unit 23 determines that the decrease in the heat insulation performance occurs.

Figure 4:
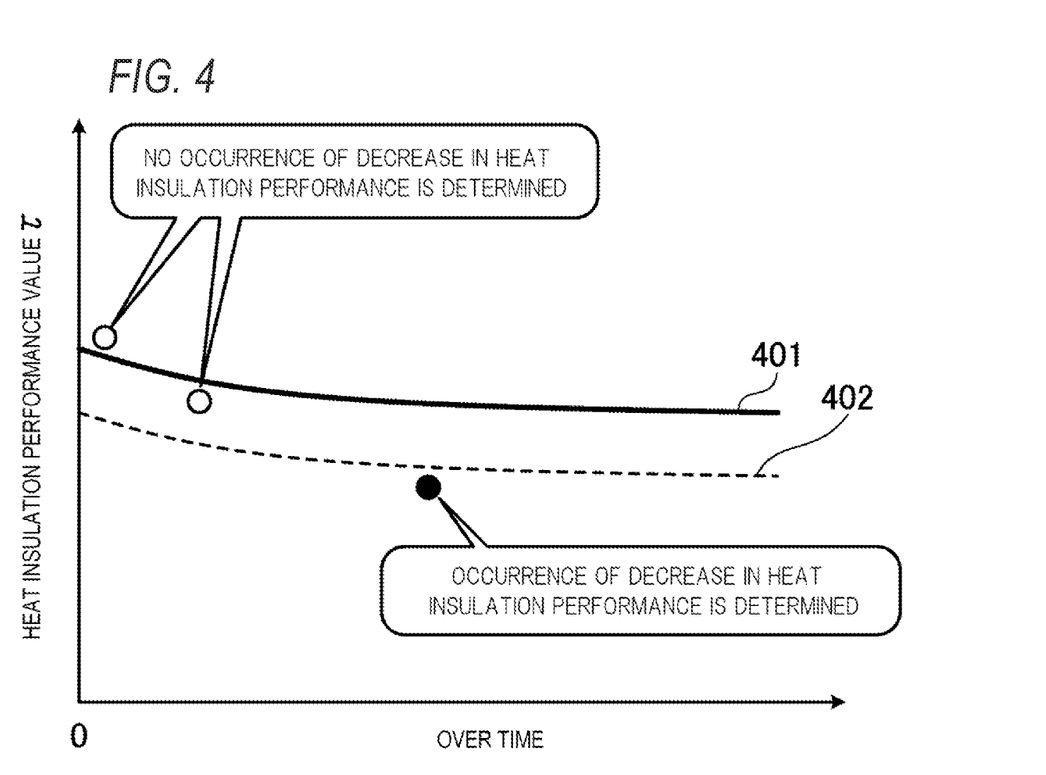
FIG. 4 is a diagram showing an example of determination as to whether a decrease in heat insulation performance of the battery pack 10 occurs.

In this way, when the difference between the heat insulation performance value τ and the reference value determined in consideration of the decrease in the heat insulation performance due to deterioration over time of the battery pack 10 is large to some extent, the determination unit 23 determines that the decrease in the heat insulation performance occurs, and thus the control device 20 can accurately detect an abnormal decrease in the heat insulation performance caused by a factor other than the deterioration over time (for example, damage to the case 11). That is, strictly speaking, even if there is a decrease in the heat insulation performance due to the deterioration over time of the battery pack 10, it is possible to prevent the determination unit 23 from determining, based on such a decrease in the heat insulation performance that can be normally assumed, to occur the decrease in the heat insulation performance of the battery pack 10.

The reference value is set in advance in the control device 20 by the manufacturer or the like of the control device 20. The reference value may be stored in another computer such as a server device provided outside the vehicle 1. When the reference value is stored in the another computer, the control device 20 may access, via a predetermined network such as the Internet, the computer storing the reference value, and may refer to the reference value stored in the computer as appropriate.

The computer storing the reference value may be, for example, a server device that can collect market data. Here, the market data is, for example, data indicating how heat insulation performance of a battery pack of the same type as the battery pack 10 changes over time in a vehicle mounted with the battery pack. That is, by determining the reference value based on such market data, the server device can set the reference value in which the decrease in the heat insulation performance due to the deterioration over time of the battery pack 10 is appropriately considered. The determination unit 23 determines whether the decrease in the heat insulation performance of the battery pack 10 occurs using the reference value determined in consideration of the market data in this way, and thus the control device 20 can accurately detect the abnormal decrease in the heat insulation performance due to the factor other than the deterioration over time.

When the determination unit 23 determines that the decrease in the heat insulation performance occurs, the estimation unit 24 estimates an abnormal portion of the battery pack 10 based on the temperatures detected by the battery temperature sensors 14.

For example, in a first case where only one of the temperatures detected by the battery temperature sensors 14 exceeds a predetermined value, the estimation unit 24 estimates the battery temperature sensor 14 that detects the temperature as the abnormal portion. Here, the predetermined value may be, for example, an average value of the temperatures detected by the battery temperature sensors 14+n [° C.] (n is a natural number of 1 or more, for example, 10).

On the other hand, in a second case other than the first case, the estimation unit 24 estimates, based on the temperatures detected by the battery temperature sensors 14, a portion of the battery pack 10 that causes the decrease in the heat insulation performance as the abnormal portion. As a specific example, in the second case, when a temperature detected by the battery temperature sensor 14 disposed on a left side changes more than a temperature detected by the battery temperature sensor 14 disposed on a right side, the estimation unit 24 estimates a left side portion of the case 11 as the abnormal portion.

When the determination unit 23 determines that the decrease in the heat insulation performance occurs, the output unit 25 outputs detection information indicating that the decrease in the heat insulation performance occurs. When the estimation unit 24 estimates the abnormal portion, the output unit 25 outputs abnormal portion information indicating the abnormal portion.

For example, the output unit 25 can output the detection information or the abnormal portion information to a notification unit 30 that can perform a notification to a user (for example, the operator) of the vehicle 1. Here, specific examples of the notification unit 30 include a display, a speaker, and a lamp display including a warning lamp provided in the vehicle 1. In this way, the output unit 25 outputs the detection information or the abnormal portion information to the notification unit 30, and thus it is possible for the notification unit 30 to notify the user or the like of the occurrence of the decrease in the heat insulation performance of the battery pack 10 or the abnormal portion of the battery pack 10 that causes the decrease in the heat insulation performance.

Functions of the acquisition unit 21, the heat insulation performance derivation unit 22, the determination unit 23, the estimation unit 24, and the output unit 25 described above can be implemented by, for example, the processor of the control device 20 executing a program stored in the storage device in advance.

[Example of Processing Executed by Control Device]

Figure 5:
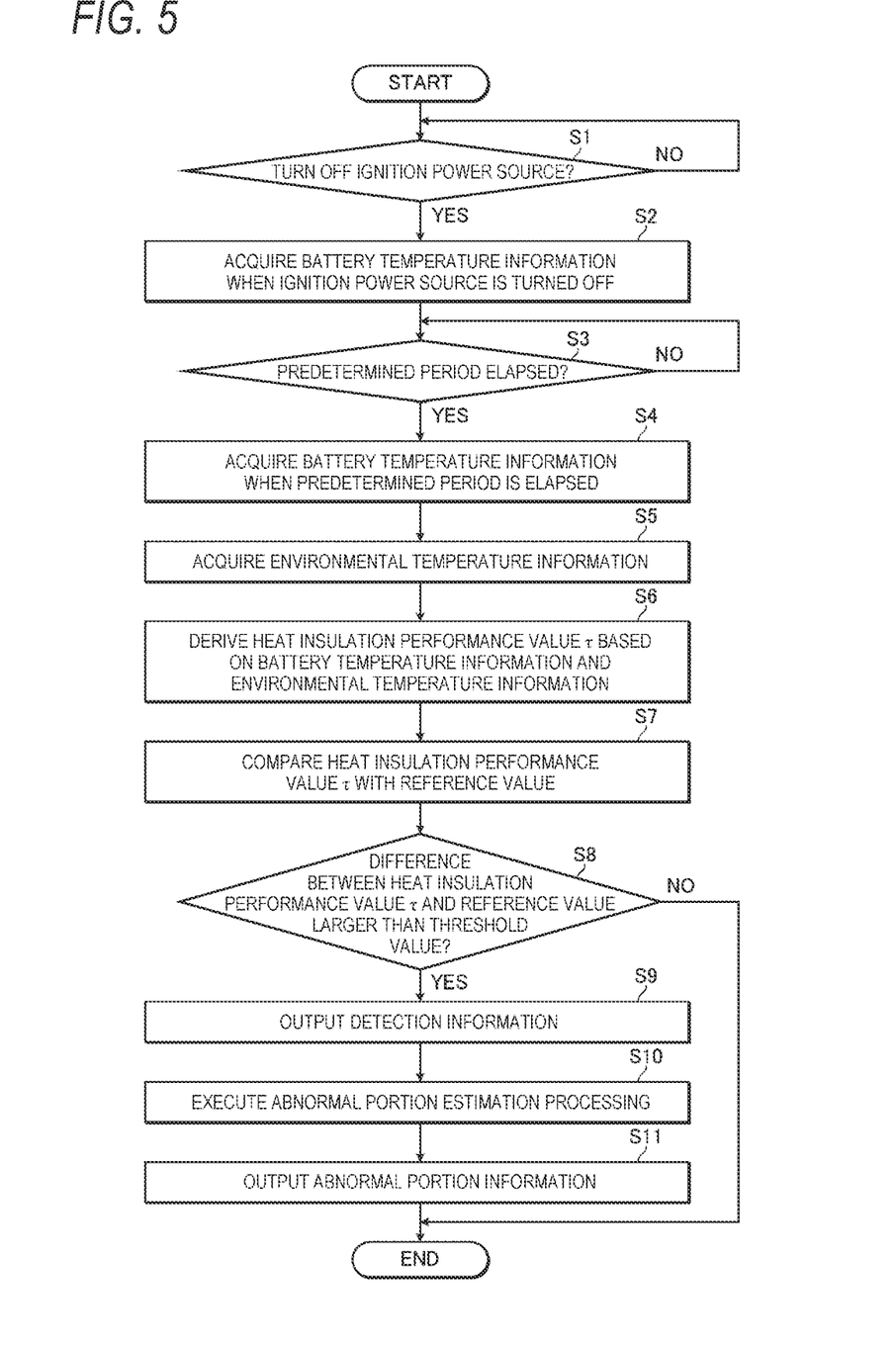
FIG. 5 is a flowchart showing an example of processing executed by the control device 20.

Next, an example of processing executed by the control device 20 will be described. As shown in FIG. 5, the control device 20 first determines whether the ignition power source of the vehicle 1 is turned off (step S1), When the ignition power source of the vehicle 1 is not turned off (step S1: NO), the control device 20 repeats the processing of step S1 until the ignition power source of the vehicle 1 is turned off.

When the ignition power source of the vehicle 1 is turned off (step S1: YES), the control device 20 acquires battery temperature information indicating a temperature of the battery module 13 when the ignition power source of the vehicle 1 is turned off (step S2).

Next, the control device 20 determines whether a predetermined period is elapsed after the ignition power source of the vehicle 1 is turned off (step S3). When the predetermined period is not elapsed after the ignition power source of the vehicle 1 is turned off (step S3: NO), the control device 20 waits until the predetermined period is elapsed.

When the predetermined period is elapsed after the ignition power source of the vehicle 1 is turned off (step S3: YES), the control device 20 acquires battery temperature information indicating a temperature of the battery module 13 when the predetermined period is elapsed (step S4), and acquires environmental temperature information indicating an environmental temperature (step S5).

Next, the control device 20 derives the heat insulation performance value $\tau$ using the above-described equation (1) based on the battery temperature information acquired in step S2 and step S4 and the environmental temperature information acquired in step S5 (step S6). Then, the control device 20 compares the heat insulation performance value $\tau$ derived in step S6 with a reference value (step S7), and determines whether a difference between the heat insulation performance value $\tau$ and the reference value is larger than a threshold value (step S8). When the difference between the heat insulation performance value $\tau$ and the reference value is equal to or smaller than the threshold value (step S8: NO), the control device 20 ends a series of processing shown in FIG. 5.

On the other hand, when the difference between the heat insulation performance value $\tau$ and the reference value is larger than the threshold value (step S8: YES), the control device 20 outputs detection information indicating that a decrease in heat insulation performance of the battery pack 10 occurs to the notification unit 30 (step S9). Then, the control device 20 executes abnormal portion estimation processing for estimating an abnormal portion (step S10). In the abnormal portion estimation processing, for example, as described above, in the first case where only a temperature detected by one battery temperature sensor 14 is prominently high, the battery temperature sensor 14 that detects the temperature is estimated as the abnormal portion. In the second case other than the first case, a damaged portion of the case 11 is estimated based on the temperatures detected by the battery temperature sensors 14.

Then, the control device 20 outputs abnormal portion information indicating the abnormal portion estimated by the abnormal portion estimation processing of step S10 to the notification unit 30 (step S11), and ends the series of processing shown in FIG. 5.

As described above, the control device 20 derives the heat insulation performance valuer based on the temperature change of the battery 12 and the environmental temperature, and when it is determined, based on the derived heat insulation performance value $\tau$ and the reference value, to occur the decrease in the heat insulation performance of the battery pack 10, the control device 20 outputs the detection information indicating that the decrease in the heat insulation performance occurs. Accordingly, the user or the like can easily monitor whether the heat insulation performance of the battery pack 10 is maintained.

When the difference between the heat insulation performance value $\tau$ and the reference value is larger than the threshold value, the control device 20 determines that the decrease in the heat insulation performance of the battery pack 10 occurs. Accordingly, it is possible to accurately detect that the decrease in the heat insulation performance of the battery pack 10 occurs.

The control device 20 determines, based on the reference value determined in consideration of the decrease in the heat insulation performance due to the deterioration over time of the battery pack 10, whether the decrease in the heat insulation performance of the battery pack 10 occurs. Accordingly, it is possible to accurately detect the abnormal decrease in the heat insulation performance caused by the factor other than the deterioration over time.

When the control device 20 determines that the decrease in the heat insulation performance of the battery pack 10 occurs, the control device 20 executes the abnormal portion estimation processing to estimate the abnormal portion of the battery pack 10, and outputs the abnormal portion information indicating the estimated abnormal portion.

Accordingly, it is possible to guide the abnormal portion to the user or the like of the vehicle 1.

In the present embodiment, when only one of the temperatures detected by the battery temperature sensors 14 exceeds the predetermined value (the first case), the battery temperature sensor 14 that detects the temperature is estimated as the abnormal portion, and in other cases (the second case), the portion of the battery pack 10 that causes the decrease in the heat insulation performance is estimated as the abnormal portion based on the temperatures detected by the battery temperature sensors 14. Accordingly, it is possible to guide an appropriate portion as the abnormal portion to the user or the like of the vehicle 1.

In the present embodiment, the battery pack 10 is disposed below the passenger compartment 4 of the vehicle 1, and thus it is possible to effectively utilize a limited space of the vehicle 1 to dispose the battery pack 10. On the other hand, when the battery pack 10 is disposed below the passenger compartment of the vehicle 1, it may be difficult to visually check a breakage of the battery pack 10 (for example, the damage to the case 11). However, according to the present embodiment, when the decrease in the heat insulation performance occurs, the control device 20 outputs the detection information indicating that the decrease in the heat insulation performance occurs, and the abnormal portion information indicating the estimated abnormal portion, and thus it is possible for the user or the like to easily monitor whether the decrease in the heat insulation performance of the battery pack 10 occurs due to the breakage or the like, and where the abnormal portion is when the decrease in the heat insulation performance occurs.

Although the embodiment of the present invention has been described above, the present invention is not limited to the above-described embodiment, and modifications, improvements, and the like can be made as appropriate.

For example, in the above-described embodiment, the battery temperature sensor 14 is provided corresponding to each of the plurality of battery modules 13, hut may be provided corresponding to each of at least two or more battery modules 13 among the plurality of battery modules 13. According to this configuration, an abnormal portion of the battery pack 10 can be estimated based on temperatures detected by the at least two battery temperature sensors 14.

In the above-described embodiment, an example in which the vehicle 1 is an electrical vehicle has been described, but the vehicle 1 may be a hybrid electrical vehicle or a fuel cell vehicle.

In the above-described embodiment, an example has been described in which an object formed by surrounding an outside thereof with a heat insulation material is the battery pack 10 including the battery 12 housed in the case 11 having the heat insulation property, but the present invention is not limited thereto. The object may be, for example, a house, a warehouse, or the vehicle 1 (the passenger compartment 4) itself as long as the object has a heat insulation material on an outside and forms a closed space on an inside. However, it is assumed that the object includes a first temperature sensor in the closed space capable of detecting a temperature in the closed space, and a second temperature sensor outside the closed space capable of detecting a temperature outside the closed space, such as the environmental temperature sensor 9 and the battery temperature sensor 14 described above.

At least the following matters are described in the present description. Although corresponding components or the like in the above-described embodiment are shown in parentheses, the present invention is not limited thereto.

(1) A detection device (the control device 20) configured to detect a decrease in heat insulation performance of a battery pack (the battery pack 10) mounted at an electrically powered vehicle (the vehicle 1),
the battery pack including a battery (the battery 12) and at least one battery temperature sensor (the battery temperature sensor 14) capable of detecting a temperature of the battery which are housed in a case (the case 11) having a heat insulation property,
the electrically powered vehicle including, outside the battery pack, an environmental temperature sensor (the environmental temperature sensor 9) capable of detecting an environmental temperature around the electrically powered vehicle,
the detection device including:
a heat insulation performance derivation unit (the heat insulation performance derivation unit 22) configured to derive a heat insulation performance value (the heat insulation performance value $\tau$) which is an evaluation value of the heat insulation performance based on a temperature change of the battery detected by the battery temperature sensor and an environmental temperature detected by the environmental temperature sensor in a predetermined period in which the electrically powered vehicle is stopped;
a determination unit (the determination unit 23) configured to determine, based on the heat insulation performance value derived by the heat insulation performance derivation unit and a predetermined reference value, whether the decrease in the heat insulation performance occurs; and
an output unit (the output unit 25) configured to output, when the determination unit determines that the decrease in the heat insulation performance occurs, detection information indicating that the decrease in the heat insulation performance occurs.

It is assumed that the heat insulation performance of the battery pack mounted at the electrically powered vehicle decreases during a use process. According to (1), it is possible to derive the heat insulation performance value based on the temperature change of the battery and the environmental temperature, and when it is determined, based on the derived heat insulation performance value and the reference value, to occur the decrease in the heat insulation performance, it is possible to output the detection information indicating that the decrease in the heat insulation performance occurs. Accordingly, the user or the like can easily monitor whether the heat insulation performance of the battery pack is maintained.

(2) The detection device according to (1), in which
when a difference between the heat insulation performance value and the reference value is larger than a predetermined threshold value, the determination unit determines that the decrease in the heat insulation performance occurs.

According to (2), when the difference between the heat insulation performance value and the reference value is larger than the threshold value, it can be determined to occur the decrease in the heat insulation performance. Accordingly, it is possible to accurately detect that the decrease in the heat insulation performance occurs.

(3) The detection device according to (1) or (2), in which
the reference value is determined in consideration of the decrease in the heat insulation performance due to deterioration over time of the battery pack.

According to (3), it is possible to determine, based on the reference value determined in consideration of the decrease in the heat insulation performance due to the deterioration over time of the battery pack, whether the decrease in the heat insulation performance occurs. Accordingly, it is possible to detect an abnormal decrease in the heat insulation performance caused by a factor other than the deterioration over time (for example, damage to the case).

(4) The detection device according to (1) or (2), in which the reference value is determined based on market data by a server device capable of collecting the market data, and the determination unit is configured to determine, based on the reference value acquired by the server device, whether the decrease in the heat insulation performance occurs.

According to (4), it is possible to determine, based on the reference value determined in consideration of the market data, whether the decrease in the heat insulation performance occurs. Accordingly, it is possible to accurately detect that the decrease in the heat insulation performance occurs.

(5) The detection device according to any one of (1) to (4), in which the battery pack is disposed below a passenger compartment (the passenger compartment 4) of the electrically powered vehicle.

The battery pack is disposed below the passenger compartment of the electrically powered vehicle, and thus it is possible to effectively utilize a limited space of the electrically powered vehicle to dispose the battery pack. On the other hand, when the battery pack is disposed below the passenger compartment of the electrically powered vehicle, it may be difficult to visually check a breakage of the battery pack. According to (5), even when the battery pack is disposed below the passenger compartment of the electrically powered vehicle, the user or the like can easily monitor whether the decrease in the heat insulation performance occurs due to the breakage of the battery pack or the like.

(6) The detection device according to any one of (1) to (5), in which the output unit is configured to output the detection information to a notification unit (the notification unit 30) capable of performing a notification to a user.

According to (6), the detection information is output to the notification unit capable of performing the notification to the user, the notification unit can perform the notification to the user based on the detection information.

(7) The detection device according to any one of (1) to (6), in which when a length of the predetermined period is t, the environmental temperature is Ta, a temperature of the battery at the beginning of the predetermined period is T0, a temperature of the battery at the end of the predetermined period is T1, and the heat insulation performance value is τ, the heat insulation performance derivation unit derives the heat insulation performance value by the following equation (1).

$$\tau = \frac{t}{\ln\left(\frac{T_a - T_0}{T_a - T_1}\right)} \quad (1)$$

According to (7), it is possible to appropriately derive the heat insulation performance value based on the length of the predetermined period, the environmental temperature, and the temperature of the battery.

(8) The detection device according to any one of (1) to (7), in which the battery includes a plurality of battery modules, the at least one battery temperature sensor includes a plurality of battery temperature sensors, each of the plurality of battery temperature sensors is provided corresponding to each of at least two or more battery modules among the plurality of battery modules, the detection device further includes an estimation unit (the estimation unit 24) configured to estimate, when the determination unit determines that the decrease in the heat insulation performance occurs, an abnormal portion of the battery pack based on temperatures detected by the plurality of battery temperature sensors, and the output unit is configured to further output abnormal portion information indicating the abnormal portion estimated by the estimation unit.

According to (8), when it is determined to occur the decrease in the heat insulation performance, the abnormal portion of the battery pack can be estimated based on the temperatures detected by the battery temperature sensors, and the abnormal portion information indicating the estimated abnormal portion can be output. Accordingly, it is possible to guide the abnormal portion to the user or the like.

(9) The detection device according to (8), in which in a first case where only one of the temperatures detected by the battery temperature sensors exceeds a predetermined value, the estimation unit estimates the battery temperature sensor that detects the temperature as the abnormal portion, and in a second case other than the first case, the estimation unit estimates, based on the temperatures detected by the plurality of battery temperature sensors, a portion of the battery pack that causes the decrease in the heat insulation performance as the abnormal portion.

According to (9), it is possible to guide an appropriate portion as the abnormal portion to the user or the like.

What is claimed is:

1. A detection device configured to detect a decrease in heat insulation performance of a battery pack mounted at an electrically powered vehicle, the battery pack including a battery and at least one battery temperature sensor capable of detecting a temperature of the battery which are housed in a case having a heat insulation property, and the electrically powered vehicle including, outside the battery pack, an environmental temperature sensor capable of detecting an environmental temperature around the electrically powered vehicle, the detection device comprising:

a heat insulation performance derivation unit configured to derive a heat insulation performance value, which is an evaluation value of the heat insulation performance, based on a temperature change of the battery detected by the at least one battery temperature sensor and an environmental temperature detected by the environmental temperature sensor in a predetermined period in which the electrically powered vehicle is stopped;

a determination unit configured to determine, based on the heat insulation performance value derived by the heat insulation performance derivation unit and a predetermined reference value, whether the decrease in the heat insulation performance occurs; and an output unit configured to output, when the determination unit determines that the decrease in the heat insulation performance occurs, detection information indicating that the decrease in the heat insulation performance occurs.

2. The detection device according to claim 1, wherein when a difference between the heat insulation performance value and the reference value is larger than a predetermined threshold value, the determination unit determines that the decrease in the heat insulation performance occurs.

3. The detection device according to claim 1, wherein the reference value is determined in consideration of the decrease in the heat insulation performance due to deterioration over time of the battery pack.

4. The detection device according to claim 1, wherein the reference value is determined based on market data by a server device capable of collecting the market data, and
the determination unit is configured to determine, based on the reference value acquired by the server device, whether the decrease in the heat insulation performance occurs.

5. The detection device according to claim 1, wherein the battery pack is disposed below a passenger compartment of the electrically powered vehicle.

6. The detection device according to of claim 1, wherein the output unit is configured to output the detection information to a notification unit capable of performing a notification to a user.

7. The detection device according to claim 1, wherein when a length of the predetermined period is t, the environmental temperature is Ta, a temperature of the battery at the beginning of the predetermined period is T0, a temperature of the battery at the end of the predetermined period is T1, and the heat insulation performance value is τ the heat insulation performance derivation unit is configured to derive the heat insulation performance value by the following equation (1)

$$\tau = \frac{t}{\ln\left(\frac{T_a - T_o}{T_a - T_1}\right)}.$$

8. The detection device according to claim 1, wherein the battery includes a plurality of battery modules,
the at least one battery temperature sensor includes a plurality of battery temperature sensors,
each of the plurality of battery temperature sensors is provided corresponding to at least two or more battery modules among the plurality of battery modules,
the detection device further comprises an estimation unit configured to estimate, when the determination unit determines that the decrease in the heat insulation performance occurs, an abnormal portion of the battery pack based on temperatures detected by the plurality of battery temperature sensors, and
the output unit is configured to further output abnormal portion information indicating the abnormal portion estimated by the estimation unit.

9. The detection device according to claim 8, wherein in a first case where only one of the temperatures detected by the plurality of battery temperature sensors exceeds a predetermined value, the estimation unit estimates the battery temperature sensor that detects the temperature as the abnormal portion, and
in a second case other than the first case, the estimation unit estimates, based on the temperatures detected by the battery temperature sensors, a portion of the battery pack that causes the decrease in the heat insulation performance as the abnormal portion.

* * * * *